United States Patent [19]

Leatherman

[11] Patent Number: 4,969,968
[45] Date of Patent: Nov. 13, 1990

[54] METHOD OF INDUCTIVE HEATING WITH AN INTEGRATED MULTIPLE PARTICLE AGENT

[75] Inventor: Alfred F. Leatherman, Columbus, Ohio

[73] Assignee: William C. Heller, Jr., Milwaukee, Wis.

[21] Appl. No.: 223,413

[22] Filed: Jul. 22, 1988

[51] Int. Cl.⁵ .............................................. B32B 31/28
[52] U.S. Cl. .............................. 156/272.4; 156/272.7; 219/10.53; 219/10.55 M
[58] Field of Search ................ 156/272.4, 272.2, 275.1, 156/275.3, 275.7, 379.6, 379.7; 219/10.55 M, 10.53, 10.75; 252/513, 519; 524/431, 440; 428/900

[56] References Cited

U.S. PATENT DOCUMENTS

| | | | |
|---|---|---|---|
| 2,393,541 | 1/1946 | Kohler | 156/272.4 X |
| 3,391,846 | 7/1968 | White et al. | 156/272.4 X |
| 3,462,336 | 8/1969 | Leatherman | 156/275.1 X |
| 3,620,875 | 11/1971 | Guglielmo et al. | 156/272.4 |
| 3,657,038 | 4/1972 | Lightfoot | 156/272.4 X |
| 3,941,641 | 3/1976 | Heller et al. | 156/272.4 |
| 4,035,547 | 7/1977 | Heller et al. | 156/272.4 X |
| 4,067,765 | 1/1978 | Heller et al. | 156/272.4 |
| 4,762,864 | 8/1988 | Goel et al. | 156/272.4 X |

*Primary Examiner*—Merrell C. Cashion, Jr.
*Attorney, Agent, or Firm*—Andrus, Sceales, Starke & Sawall

[57] ABSTRACT

An integrated multiple particle heating agent is provided for heating, particularly using the agent for heating and bonding plastic substrates. The integrated multiple particle heating agent includes significant portions of non-conductive ferromagnetic oxide particles which generate heat because of hysteresis losses and of conductive ferrous particles which generate heat because of eddy current losses. The dual particles are thoroughly intermixed and respond to a magnetic field of an appropriate RF frequency. The ferromagnetic particles are submicron size and the ferrous particles are micron size. The particles are combined with an inert resin carrier and applied as a coating, directly incorporated within the substrate, or as a separate element. The ferromagnetic oxide loading is generally less than the ferrous particle loading, with a range of 30 to 60 percent (40 to 50 preferred) by weight of ferrous particles and a range of 10 to 50 percent (15-25 preferred) by weight of the oxide particles. The radio frequency magnetic field can be in the range of 1.2 to 7 megahertz ($MH_z$) with 3.5 to 4 $MH_z$ being typical. The integrated submicron sized ferromagnetic particles and micron sized ferrous particles generate heat at a significantly and unexpectedly high rate using a single RF magnetic field of a relatively low frequency. The percentage loading may vary with different substrates.

24 Claims, 2 Drawing Sheets

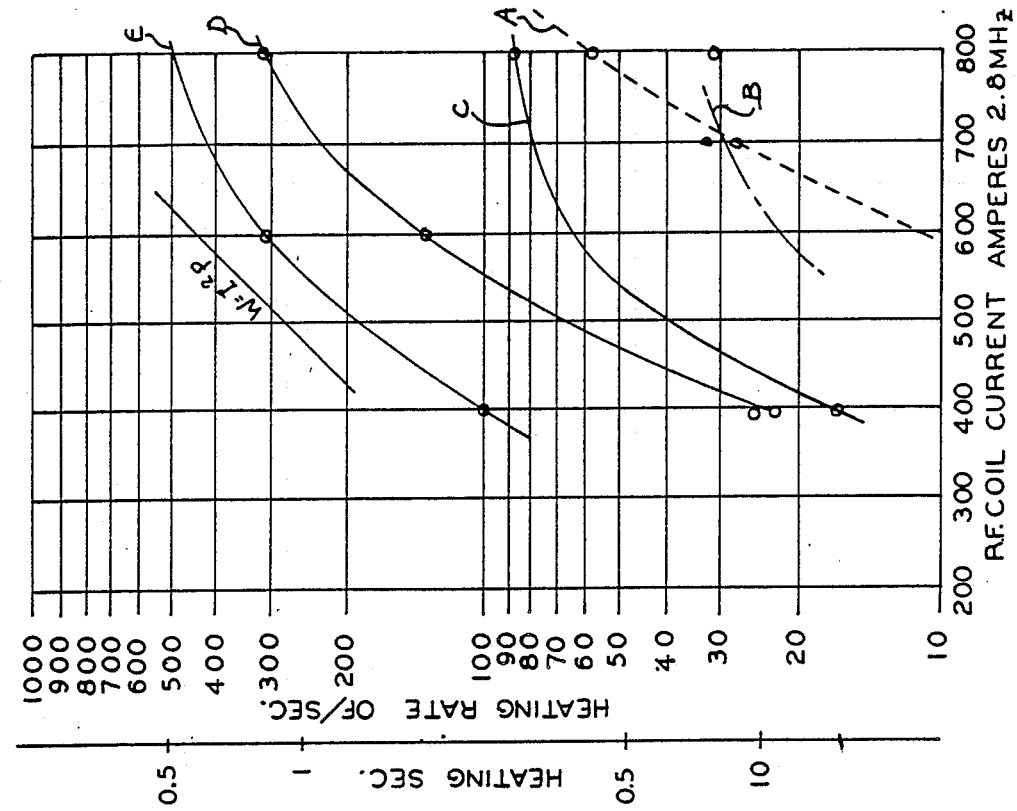
FIG. 4 HEATING RATES AT 4.5 MHz
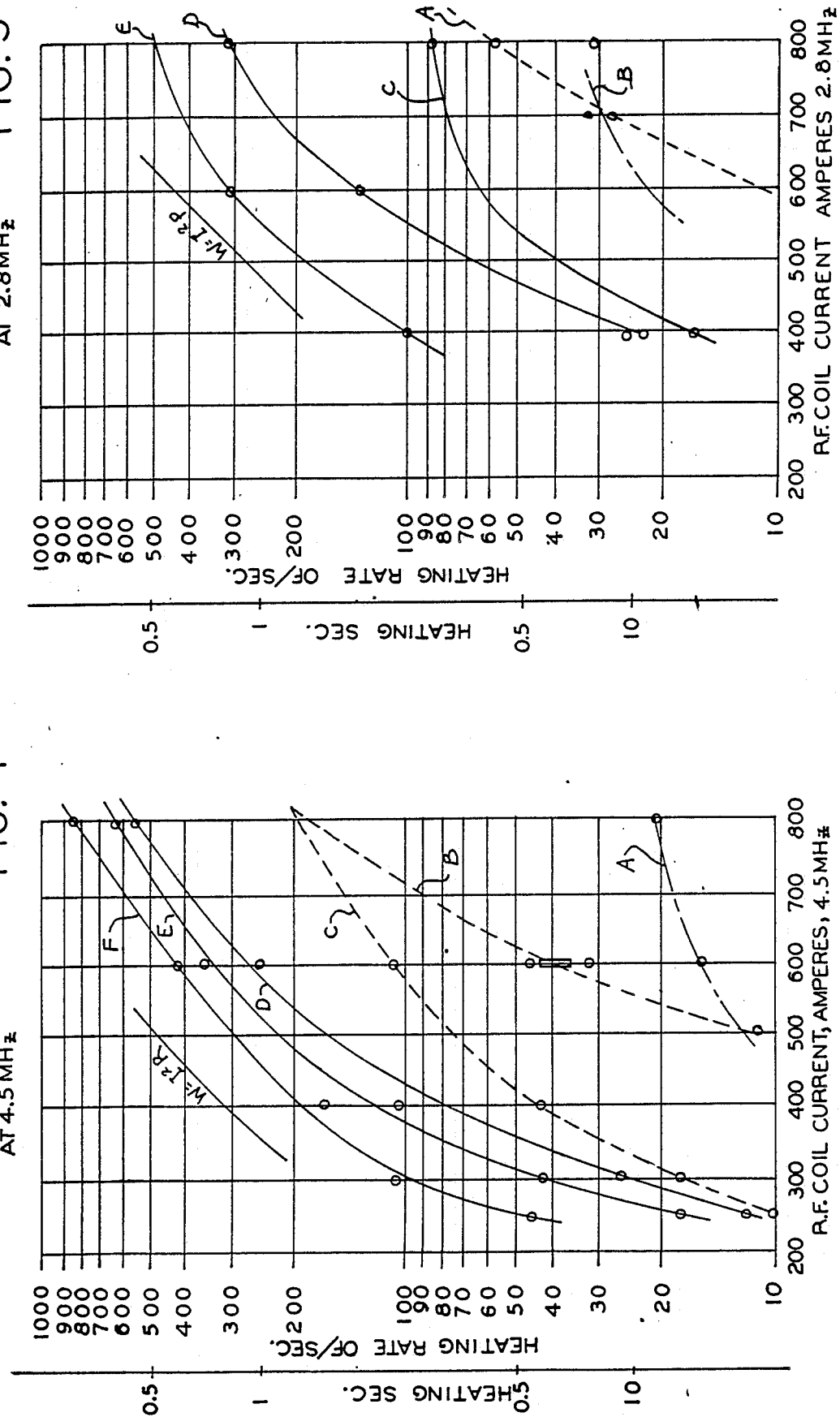
FIG. 5 HEATING RATES AT 2.8 MHz

METHOD OF INDUCTIVE HEATING WITH AN INTEGRATED MULTIPLE PARTICLE AGENT

Background Of The Invention

The present invention is particularly directed to an integrated multiple particle heating agent and the method of induction heating using such agent, and particularly for heating of another medium, forming of high quality bonds to one or more substrates and the like.

Bonding of materials to each other is involved in the manufacture of a great number of products. The very substantial development and use of non-metal elements and surfaces such as plastics, elastomers, glass, paper, and the like has resulted in a significant development in heating processes based on inductive heating principles. If appropriate particles are imbedded within or applied to a non-metallic medium and subjected to an alternating magnetic field of an appropriate frequency, heat is generated within the particles with corresponding thermally conductive heating of the non-metallic medium. The present inventor has over the years developed a particularly unique and practical inductive heating of non-metallic members based on the use of non-metallic particles which are submicron in size. The particles respond to a radio frequency magnetic field to create heat as a result of hysteresis. Other heating systems have employed basically other distinctly different approaches. For example, it is well known that by using larger conductive particles, eddy currents are formed within the metal particles. Because of the resistance of the ferrous metal particles, the eddy currents create heat centers. Although some hysteresis heating may occur in the larger particles, the ohmic loss is the primary and significant heat source.

The non-conductive ferromagnetic particles for hysteresic heating include the submicron particles which have been widely used by the present inventor in the development of plastic bonding processes and devices. The materials are preferably a ferromagnetic oxide, as distinguished from various other conductive magnetic iron materials. Thus, as disclosed for example, the magnetic iron oxide for hysteresic heating are not conductive and do not generate heat as a result of eddy currents. Generally, the particle widely used by the present inventor for commercial application has been a gamma ferric oxide. The particles used for hysteresic heating are generally identified herein as the non-conductive particles.

An early patent showing the non-conductive magnetic iron oxide for bonding through hysteresic heating is shown in U.S. Pat. No. 3,461,014 to James. A number of other patents by the present inventor as well as others assigned to the common assignee with the present application are available based on the pioneering and development of induction bonding based on hysteresis. In contrast, conductive ferrous metal particles of large sizes are used in eddy current heating. The conductive particles are also well known and commercially available and are generally identified herein as ferrous particles. Typical teachings and examples of such material will be found in U.S. Pat. No. 2,393,541 to Kohler and U.S. Pat. No. 3,620,875 to Guglielmo, Sr.

Various means for improving the bonding characteristic have been developed in the prior art. Thus, U.S. Pat. No. 3,941,641, which issued to the present inventor, discloses addition of magnetic metal alloys in a hysteresis heating agent and application of a low or audio frequency field for purposes of agitating the interface of the bonding materials. That patent also notes that the conductive metal alloy particles may also generate some heat as a result of eddy currents and may in fact generate heat somewhat more quickly as well as providing localized mechanical forces, and that mixing of still other particles may vary the flux characteristic to increase the responsiveness of the ferromagnetic particles. The patent teaching however is particularly directed to the hysteresis particle heating in the presence of an audio frequency source plus a radio frequency source. The audio frequency source interacts electromechanically with the large particle parts to agitate the surface. The high or radio frequency source creates the significant and operative heating through the hysteresis effect.

As more fully disclosed in the various patents of the inventor, inductive heating using nonconductive ferromagnetic particles has significant advantages from the standpoint of the frequency required as well as time and quality of bonds. Further, various materials which can only be joined with great difficulty can be appropriately joined with a fusion bond by the use of an appropriate interface bonding element having improved compatibility with the noncompatible plastic substrates. The result, of course is a highly improved product.

Further, eddy current heating with the large ferrous particles requires use of high frequency equipment generally operating in a range of 5 to 30 megahertz. In contrast, the use of the non-conductive ferromagnetic oxide particles with hysteresis operates in a much lower frequency range and generally in a range of 2 to 4 megahertz. Although eddy current heating of particles can be effected at lower frequencies including those in the range of 2 to 4 megahertz, a significant decrease in the heating rate results and is uniformly considered as undesirable and impractical. As the frequency decreases, skin effect phenomenon adversely effects eddy current formation and reduces the creation of heat. Similarly, with eddy current heating, relatively large particles are required to permit formation of circulating current flow in the particles.

In all forms of induction heating, the system and apparatus should be designed to provide a maximum heating rate for any given power or current, and conversely for any given heating rate, the design should provide for minimum power consumption. A high heating rate of course is desired for maximum efficiency of production. Minimal power consumption is of course desired to minimize the direct cost of production. Optimum heating rates and minimum power consumption may however require expensive and specially designed coils. Thus, it is known that increasing the current in a coil in either of the inductive heating processes will result in an increasing heat rate. In hysteresis formulations, the rate increases quite rapidly whereas in eddy current formulations, a more gradual increase is obtained. Apparently as the current and power increases, the hysteresis loop of the non-metallic ferromagnetic oxide and like nonconductive materials becomes significantly more square. This establishes a significant increase in the heating. However, the design requirements for the coils to make use of high current and frequency levels can be extremely difficult to implement.

Notwithstanding the wide usage and development of the various inductive heating processes using particles related to a particular heat generating phenomenon, there is a continuous need for improved processes and materials. Modern day mass production is consistently and continuously concerned with reducing the time and cost of production without reducing the quality of product.

SUMMARY OF THE PRESENT INVENTION

The present invention is particularly directed to a unique integrated multiple particle heating agent for inductive heating and particularly using said agent for heating of plastic substrates and fusion bonding to a substrate. Generally, in accordance with the present invention, an integrated multiple particle heating agent consists essentially of significant portions of non-conductive particles and of conductive particles which are thoroughly intermixed into a distributed mass or aggregate to interact in response to a magnetic field of an essentially given RF frequency. The particles are preferably selected to form and cover a wide range of particle sizes including submicron sizes of non-conductive particles and ferrous conductive particles of at least one micron in size. These particles are formed into an essentially uniform integrated heating agent with a magnetically inert carrier. The agent is applied as a preform, a coating or within the substrate and subjected to the RF magnetic field. Although the size range variation and the relative levels of the different sizes may vary significantly, the applicant has found that the integration of the fine submicron particles and the large ferrous particles results in an unexpected major improvement in the heating and bonding characteristics, and particularly in the resulting heat rate. Although the exact reason or theory supporting the unexpected improvement is not fully realized, the inventor believes that the integration or unification of the distributed high temperature centers created by the larger particles and the distributed small heating centers provided by the smaller particles interact to decrease the magnetic reluctance and further provides for a more rapid dispersion of the heat throughout the bonding element with improved and more rapid heat generation in the different particles and the bonding element. Thus, the element is heated more rapidly and more uniformly, and has been found to significantly increase the heat rate.

Generally in accordance with the teaching of the present invention, the percentage loading of the integrated particle heating agent is not critical but significant quantities of both the submicron nonconductive particles and the micron sized particles for the simultaneous different heating characteristic formations are necessary to obtain the significant benefit provided by the teaching of the present invention. Generally, the ferrous conductive particles loading would be at a maximum of 60 percent by weight. The non-conductive loading is generally less than that of the ferrous particle loading. Although larger sized conductive particles can be used, if the conductive particles are greater than 200 mesh, special consideration in handling may be necessary. The multiple integrated particles for significant applications may include the eddy current conductive particles in the range of 30 to 60 percent by weight and the hysteresis non-conductive particles in the range of 10 to 50 percent by weight. The radio frequency source can be in the range of 50 Khz to 7 megahertz ($MH_z$), with a preferred range of 1.8 to 4.8 $MH_z$ and 3.5 to 4 $HH_z$ being a typical range used in practicing the invention. The inventor has found that the integrated particle agent works well if one uses approximately 40 percent by weight of the conductive particles and approximately 25 percent by weight of non-conductive particles, with the balance being formed by an inductively inert plastic carrier.

Of course, an important objective of the invention in addition to the increased heating rate is the achievement of a bonding agent that produces a sufficiently strong bond for the specified application and use. Both the ferrous particles and the oxide particles are in effect foreign materials that can have a negative effect on resultant bond strength if used in excessive quantities in the bonding material carrier resin. The level of adverse effect varies with the identity of the carrier resin. The resins used for the various formulas set forth herein are mainly from the polypropylene family and feasible uses exist even for the most highly loaded of the examples given herein. The bond strength characteristics of any agent used must be tested in accordance with standard procedures prior to placing a product in service to assure that the available results match the specification for that application.

The present inventor has thus found that by using the integrated submicron sized non-conductive particles and micron sized conductive particles, with each being a significant part of the bonding agent by weight, heat generation is obtained at a rate significantly and unexpectedly greater than the combined heating rate of the two materials alone when subjected to a single RF magnetic field. Further, highly uniform interface heating is provided. Another advantage which has been found is the ability to effectively bond with a greater distance between the high frequency coil and the work. The integrated multiple particle agent can be handled in commercial production as by extruding and the like. The material is stable and readily affixes to substrates and maintains its integrity during the working and processing of the work.

The increased heating rate, without sacrifice of uniformity of heating, of course also dramatically decreases the production time required to effect any particular heating or bonding process. Tests conducted by the inventor with the hysteresis particles as the standard have indicated that the heating rate increases, and the increases are readily obtained on the order of 200 to 600 percent and increases in the range of 1,000 to 2,000 percent have been obtained using available commercial materials. Thus, as a generalization, the present invention has increased the efficiency of the induction heating over present day standards, and the increase has been 6½ or more times. This is clearly a much greater advance than would be anticipated by merely adding the two materials with their normal or standard heating characteristics.

The inventor's investigation to date has indicated that the combination of 25 percent ferromagnetic oxide and 40 percent ferrous particles with an inert bonding resin provides a highly satisfactory fusion bonding element. The combination provides a highly satisfactory commercial agent and in particular an extrudable agent with a significantly acceptable mechanical or fusion type attachment to a plastic substrate. The heating is created without significant adverse arcing. Although the strength of the bond may not be totally equal to a standard which is established by the use of hysteresis particles, test of the bond showed it to be more than adequate, and readily justified by the greater efficiency in production.

The particular relative percentage loading may vary with the particulars of the substrates and the like. The incorporation of the ferrous conductive particles, for example, requires a somewhat thicker layer. Although the present invention may not provide as thin a layer as permitted with the non-conductive particles alone, the new agent permits a significant reduction in the thickness of the bonding agent when compared to other conductive metal eddy current systems. Further, the proportion of the small submicron particles can be increased with the larger sized particles decreased if necessary as a compromise which accepts less than optimum heating efficiency. However, thicker bonding agents with the integrated particles will improve the heat distribution and thermal activity throughout the bonding element and substrates when compared to the various prior art approaches of a single particle heating process.

Although the present invention has been developed and found to provide extraordinary results in the area of fusion bonding, it will now be readily recognized by those skilled in the other heating arts that the invention can be used in any area for high frequency induction heating of non-metallic workpieces and substrates. Various other fields also readily come to mind. For example, in compression molding and in transfer molding, induction heating of the molds and molded material may be used. Heat sealing of substrate elements, such as generally shown in U. S. Pat. No. 4,541,891, may be readily adapted to the use of applicant's new integrated multiple particle heating agent. Hot-melt adhesives, heat shrink films and heat activated foam may be combined with the integrated particles for induction heating.

In summary, the present invention not only improves the bonding or heating process but further permits use of cost efficient apparatus.

BRIEF DESCRIPTION OF THE DRAWINGS

The drawings furnished herewith generally illustrate the best mode presently contemplated for the invention and are described hereinafter.

In the drawings:

FIG. 4 is a graphical illustration of the heating rates of various prior art formulations and the present unique formulations; and FIG. 5 is a similar graphical illustration at a lower radio frequency.

DESCRIPTION OF THE ILLUSTRATED EMBODIMENT

Figure 1:
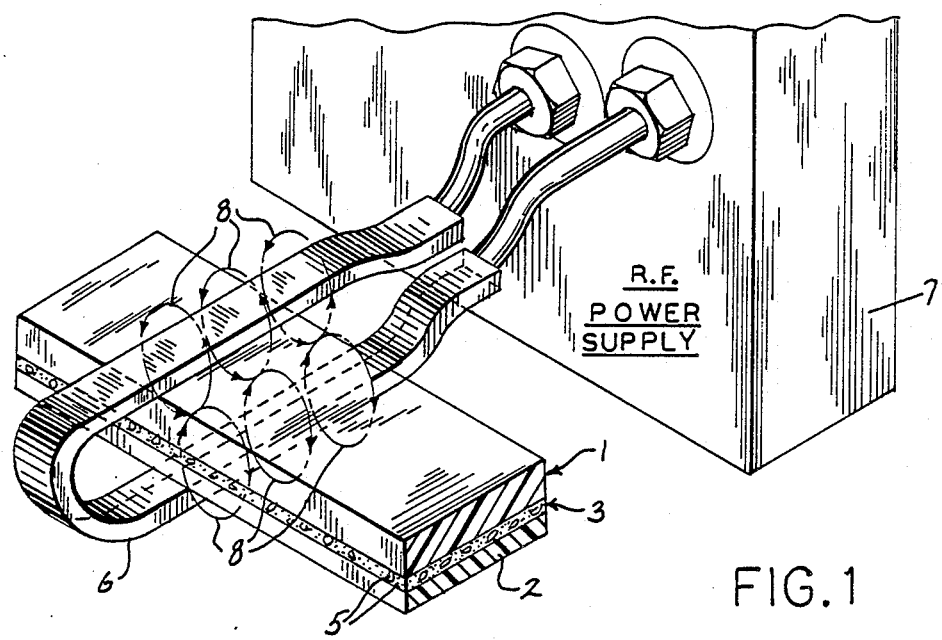
FIG. 1 is a side view of a pair of substrates located in an inductive bonding apparatus.
Figure 2:
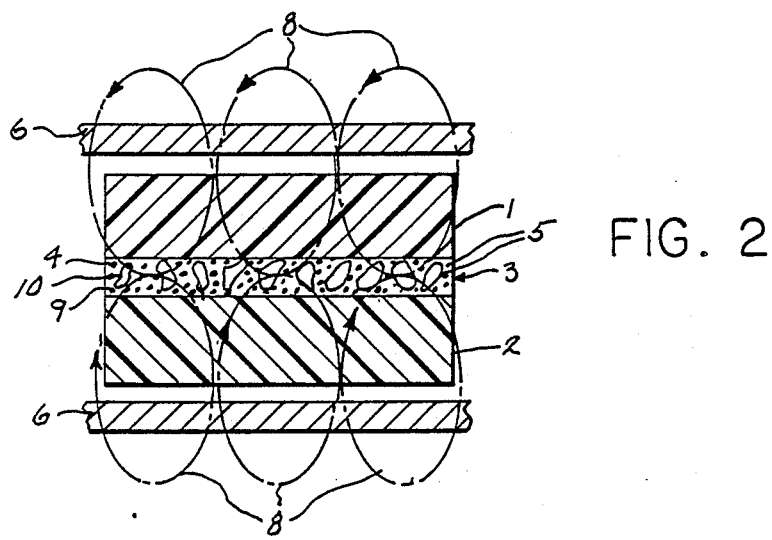
FIG. 2 is an enlarged sectional view of the substrates shown in FIG. 1.

Referring particularly to the drawings and to FIGS. 1 and 2, the invention as illustrated is applied to a simple bonding of a first plastic substrate 1 to a second plastic substrate 2 with an interposed bonding layer 3. Substrates 1 and 2 may, for example, be various plastic elements which are to be bonded over an interface area to form a composite article. The present invention is described in connection with such an application because it is typical of the significant development over the years by the present inventor and assignee in the field of inductive fusion bonding of plastic materials. However, as noted previously and as hereinafter summarized, the present application which is particulary directed to a unique integrated multiple particle bonding agent is applicable to many other applications and, in fact, broadly applicable whenever inductive heating of a non-metallic material is desired or applicable.

Figure 3:
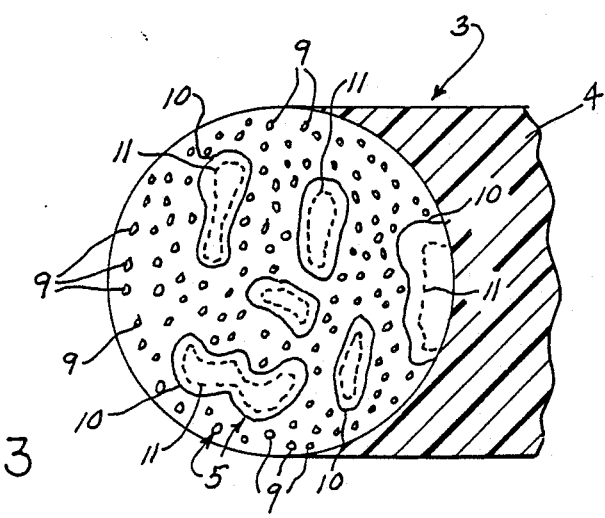
FIG. 3 is an enlarged fragmentary view of a bonding agent shown in FIGS. 1 and 2.

In the illustrated embodiment, the interposed bonding element or layer 3, as shown in FIG. 3, consists of a compatible plastic resin material 4 which is compatible with and fusion bonds to each of the particular plastic substrates 1 and 2. The bonding element 3 has incorporated therein a dispersion or distribution of the integrated multiple particles 5 of the present invention. In FIG. 3, a portion of the element 3 is shown without the particles 5 to permit sectioning to show the plastic.

A radio frequency coil unit 6 is shown encircling the composite structure, and connected to a radio frequency source 7. Energizing of coil unit 6 generates a radio frequency magnetic field 8 impressed on and through the composite structure. The high frequency source 7 is selected to establish a magnetic field in the megahertz range and typically will create a field in the range of about 1.8 to 7 megahertz. For purposes of the present invention, the inventor's present analysis indicates that a magnetic field should be at least 10,000 hertz and that any significantly lower frequency such as the audio frequency range does not obtain practical results and benefits of the present invention as hereinafter discussed.

The radio frequency source 7 and the coil unit 6 are readily known devices which are commercially and readily available.

Specific descriptions of various devices are found in various prior art relating to inductive fusion bonding and heating as heretofore identified. No further description thereof is given other than is necessary to fully describe and explain the phenomena and results of the present invention.

The present invention, as previously noted, is particularly directed to the integrated multiple particle heating agent which is dispersed throughout and forms a part of the bonding element or layer 3. Generally, in accordance with the teaching of the present invention, the particle bonding layer 3 includes two distinct and different particles, including submicron sized particles 9 and larger micron sized particles 10.

Referring particularly to FIG. 3, a substantially enlarged fragmentary portion of the bonding element 3 is illustrated. The element includes the very small particles 9 shown as small generally spherical particles, but other shapes and configurations are available. The relatively large metal particles 10 are also shown. The particles 10 have a significant body size, particularly when compared to the submicron particles 9. The sizes of the particles 10 are such that in the presence of the magnetic field 8, a current flow 11 is induced within the particles as small, short circuited loops or eddy current.

The small submicron particles 9 are non-conductive ferromagnetic oxide, generally including gamma ferric oxide ($Fe_2O_3$) and ferrosoferric oxide ($Fe_2O_3\ FeO$), more commonly known as magnetite. Such particles 9 have been widely used by the present inventor in fusion bonding and inductive heating. Such particles are fine submicron sized particles and are presently readily available in powder-like form. The gamma ferric oxide has been found over the years to provide a practical and optimum particle operating in the presence of the radio frequency magnetic field to generate heat as a result of hysteresis.

The larger ferrous particles 10 are iron particles and are much larger than particles 9. Generally, the particles 10 are in a range up to 75 microns, but at least one micron in size. Larger iron particles are desirable because a greater heat rate can be obtained. The ferrous conductive particles 10 heat by resistive losses and are significantly conductive in contrast to the non-conductivity of the oxide particles 9. The particles 10 respond to the same inductive field 8 as the particles 9 to generate heat. However, the heating phenomenon in particles 10 is due essentially to the inductive creation of eddy currents 11 within the particles 10. The resistance of the ferrous conductive particles 10 is such that a significant heat level is generated as a result of resistive losses. As each of the particles form a heat center, the large heat centers of particles 10 require special thermal consideration.

Generally, each of the particles 9 and 10 forms a heat source and center. With a thorough mixing and distribution of the small particles 9 and the large particles 10, the heat in the element 3 has been measured and was significantly uniform. It would appear that particles 10 function in past as heat distributors and rapidly distribute the heat throughout the agent.

As more fully developed hereinafter, the combination of the small ferromagnetic particles 9 and the large ferrous particles 10 results in a dramatic and unexpected increase in the heating rate and characteristic. In particular, the heat generated within the bonding element 3 is increased when compared to either of the individual heat sources, and over the benefit anticipated by the combination of the two heat sources. Further, a uniform heat pattern exists within and throughout the element 3. Thus, hot spots are avoided and a uniform heating of the substrates 1 and 2 is established.

Although a complete theoretical explanation and understanding has not been definitely established, the inventor considers the probability to be that the different particles change and modify the heat distribution and the magnetic reluctance or permeability within the element or layer 3 in such a manner that each of the different particles respond in a dramatic and interrelated manner. Thus, increases of 200% to 600% are readily obtained in the heating characteristic and increases of 1,000% and 2,000% have been encountered. Nothing in the literature the inventor has seen would appear to explain this dramatic change, or suggest that the combination should be used. This is particularly true in view of the fact that generally the particles 9 have been used with a frequency source in the range of 2 to 4 megahertz. In contrast, in the wide usage of eddy current heating including fusion bonding, the magnetic field is uniformly operated in the range of 5 to 30 megahertz. This difference in frequency is used because of the different phenomena involved in the two methods of heating.

Although single particle sizes can, of course, be used in the integrated multiple particle agent, graduated sizes of each of the particles 9 and 10 may, of course, also be used. In any event, the integrated particles 5 should include a significant weight of micron particles and also a significant, and preferably lesser, weight of the submicron-sized particles.

Generally, with the present-day technology, the inventor has developed a generalized formulation for fusion bonding of plastic substrates consisting of approximately 40% ferrous iron particles, 25% gamma ferric oxide particles and a balance of an inert resin material such as polypropylene. All percentages are by weight. Such material is particularly desirable in that the bonding agent is desirably an extrudable bonding layer. Generally, the resin is selected to have a relatively low viscosity to provide a relatively molten or free-flowing resin. As more fully developed hereinafter, the percentages of the particles 9 and 10 may however be varied significantly within the present invention. The integrated multiple particle heating agents are generally operated in the range of 1.2 to 7 megahertz, with a lower range of 1.8 to 4.8 megahertz preferred. A typical frequency is 3.5–4 megahertz. The lower frequencies are desirable to minimize the problems presented in designing and building relatively large coils, while maintaining appropriate energization of the members located within the coil. This is particularly significant in certain practical environments, such as automobile manufacture, where relatively large panels are bonded to other members. Such designs almost tend to demand relatively large coils. Operating large coils in a range of 5 to 30 megahertz and above makes the design difficult and the coil construction highly expensive. The lower frequency decreases the heating rate somewhat, but the overall heating rate reduction with the present invention is significantly less than that encountered in the prior art and particularly when compared to the ferrous iron used in eddy current heating.

The significant difference in the results obtained with the present invention compared to conventional inductive heating in the present field is illustrated in the graphical presentations of FIGS. 4 and 5.

FIG. 4 is a graphical representation illustrating the different results between prior art formulations and those of the present invention. A single non-conductive ferromagnetic oxide particle formulation is shown as a standard heating reference. Two eddy current ferrous metal particle formulations are shown. Three compositions or formulations based on the present invention are shown.

The particular compositions are tabulated in the following table.

In the graphical illustration of FIG. 4, the ferrous iron or conductive particle curves are shown in dashed lines. The ferromagnetic oxide or nonconductive particles alone are shown in a phantom lines, while the integrated particle formulations are shown in solid line presentation.

TABLE I

| | SELECTED HEATING RATES AT 4.5 MH$_z$, 600A | | |
|---|---|---|---|
| Bonding Agent | Composition | Heating Rate | Comparison |
| A | 40% minus 200 mesh iron, 60% inert | 16° F./sec | 41% |
| B | 30% ferric oxide, 70% insert "standard" | 39° F./sec | 100% |
| C | 60% 20–200 mesh iron, 40% inert | 108° F./sec | 277% |
| D | 25% ferric oxide, 40% minus 200 mesh, 35% inert | 255° F./sec | 654% |
| E | 20% ferric oxide, 50% minus 200 mesh, 30% inert | 364° F./sec | 933% |

TABLE I-continued

SELECTED HEATING RATES AT 4.5 MHz, 600A

| Bonding Agent | Composition | Heating Rate | Comparison |
|---|---|---|---|
| F | 20% ferric oxide, 50% 20-200 mesh, 30% inert | 425° F./sec | 1,090% |

The results indicate that the multiple particle heating formulation of the present invention provides results which are a significant improvement when compared to that of the the prior art systems.

The test arrangement for obtaining of the above results used a hairpin type coil having cooled conductors which were ⅜ inch in width and approximately ¼ inch thick. The coil sides were spaced from each other by 0.25 inches and from the specimen by slightly less than one-half that spacing.

In Table I, it should be noted that the sample bonding agent identified by label D consists of 25% ferric oxide and 40% of a −200 mesh ferrous iron. The balance is an inert material. The integrated particle 5 of the sample basically uses the bonding particles of samples labeled A and B.

The two individual formulations provide a heating rate of 100% for the ferromagnetic standard formulation and 41% for the −200 mesh iron formulation.

The integrated particle formulation however provides a heating rate of 255° F. per second, which compared to the standard produces an increase in heating of 654%.

As noted previously, the present invention is also advantageously applied in those areas where present hysteresic induction heating has been widely used Generally in the prior usages of induction heating and hysteresic heating, various minimum levels were required for efficient bonding. Generally, inductive ferrous heating required at least 40% particle content by weight. Oxide particle heating generally required on the order of 20-25% oxide particles by weight. These percentages are related to the typical resins such as polyethylene, polypropylene and plastic of a similar density and weight. Other resins such as fluoroplastic have a greater density and the formula would be adjusted accordingly. Basically, the particle aggregate is a corresponding preferred 60% ferrous particles and 40% oxide particles. If the prior art mixture, such as examples A and B, are directly combined, the resulting combination provides a combination of hysteresic oxide particles equal to 15% by weight and inductive iron heating particles equal to 20% by weight. The oxide weighting has been reduced by 50%. However, the heat rate at least equals that of the oxide and overall is believed to give improved bonding results. Each of the particles has its own chemical charcteristic and reaction with the carrier resin. The combination permits the desired loading with reduced adverse effect. The integrated particles might thus be used with various resins where normal loading of either one of the particles alone would not provide a satisfactory result because of the adverse interaction between the chemistry of the particular particle and the resin. The small hysteresic particles which are generally in the submicron size in particular present a large surface area which would tend to increase a reaction. The cost of the proper oxide particles is also significantly greater than for the ferrous iron particles, and the reduction in the oxide loading contributes to a more cost effective process and product. The combination of the reduced oxide and iron provides for the desired loading at a reduced cost to maintain the rapid and effective bond while minimizing the probability of adverse interactions of the products.

The combination also provides the impressive heating rates in that using either of the particles at the lower levels alone provides a significant reduction in the heating rate and in effect a heating rate which for practical commercial purposes, would not be generally acceptable.

The following Table II provides a table of selected heating rates at 2.8 megahertz and 600 amps. Again, the ferromagnetic oxide of the same formulation was used as a standard. A ferrous iron formulation at 60 percent −200 mesh particles was used to help illustrate the invention at 2.8 MHz because results for the 40 percent formulation at this lower frequency were too low to be accurately measured. Similarly, two of the integrated particle formulations of the present invention were tested.

TABLE II

SELECTED HEATING RATES AT 2.8 MHz, 600A

| Bonding Agent | Composition | Heating Rate | Comparison |
|---|---|---|---|
| A | 30% ferric oxide 70% insert, "standard" | 15° F./sec | 100% |
| B | 60% minus 200 mesh iron, 40% inert | 23° F./sec | 153% |
| C | 60% 20-200 mesh iron, 40% inert | 64° F./sec | 427% |
| D | 25% ferric oxide, 40% minus 200 mesh, 35% inert | 142° F./sec | 947% |
| E | 20% ferric oxide, 50% 20-200 mesh, 30% inert | 319° F./sec | 2,127% |

The results of using the formulations of Table II are graphically shown in FIG. 5, with corresponding line presentation.

At the lower radio frequency, it is noted that the increases of the present invention are even more dramatic, even though essentially identical particles and proportions were used. As Table II shows, although formulation E has less oxide than A and less iron than B, the results for E are over 2000% higher than for A and over 1000% higher than for B. The dramatic changes are not shown in true perspective in the graphical illustration of FIGS. 4 and 5 because they are on semi-log graphical paper which was used to provide a more complete presentation of all data.

It should be noted that the present invention is particularly unique and applicable to the use of the lower radio frequency source, which minimizes problems in the design and construction of the coil structures. The unique integrated multiple particle bonding element of this invention apparently may be explained in terms of the particle interaction with the increased heat distribution within the bonding element compared to the eddy current heating agent, and the reduction in the magnetic reluctance of the agent compared to the hysteresis heating. In any event, applicant has found that the integrated multiple particle formulation provides an improved result not only in efficiency, but in permitting bonding of articles and materials which have heretofore not been practically bonded because of the difficulty in creating the necessary heat level or because of the heating period required using either the submicron particle heating or the micron particle heating. Further, the construction of the apparatus in relation to the work is not as critical. The result of the invention is therefore a more practical and cost effective inductive heating and bonding method.

Further, applicant has conducted heat pattern tests on substrates. The inventor found that with ferrous particle eddy current heating, a uniform heat pattern could not be obtained even on relatively long heat cycles, such as 20 to 30 seconds. However, the integrated particle formulation with the same conductive ferrous iron particles and the nonconductive ferromagnetic particle in a magnetic field of 2.5 megahertz resulted in a practically instantaneous uniform heating pattern throughout the layer. Apparently, the uniform distribution of the submicron particles between the micron particles in combination with the effective heat sources of the conductive particles and rapid distribution from the heat centers creates the uniformity even though hot heat centers may appear at certain particles. An analysis would indicate that the submicron particles, that is, those less than one micron in the new formulation, establish small thermal distances between the oxide particles, between the oxide and ferrous particles, and in between the ferrous particles. The inventor has also found that the small submicron particles do, at times, tend to form an agglomerate and a resulting hot spot. In the present invention, the thorough mixing of the two different particles during preparation appears to minimize any such formation. The larger ferrous metal particles appear to grind and separate any agglomerate of the small submicron particles, with a further uniform dispersion of the particles in the integrated multiple particle agent.

The effect of the present invention as applied in connection with epoxy adhesives was also analyzed. A commercial two-part epoxy adhesive material identified by the number Fusor 320I/322I was received from Lord Corporation. The material has gamma feroic oxide particles which is understood to be approximately 15% by weight. The material when used alone required 90 seconds to establish a "gel" state at a current of 600 amps. The material is an inductive heated epoxy adhesive and is described in their data sheet DS10-3049 under date of May 1, 1987. Tests were run adding 40% by weight of a −200 mesh ferrous particle to the two components of the two-part adhesive. The addition of the ferrous iron particles, with the final formulation 40% by weight iron particles established a "gel" state in 60 seconds at only 200 amps. The added iron was Anchor 1000 sold by Hoeganaes Corporation, which was specially processed to remove any particle over 200 mesh in size. A "gel" condition was reached in 45 seconds at 225 amps. By increasing of the amperage to 250 amps, a "gel" condition was reached in 20 seconds. The Lord formulation required 90 seconds at 600 amperes to create a "gel" condition. An early Lord formulation having a loading of 30% by weight of the particles required 60 seconds at 485 amperes to create the "gel" condition. The new formulation also produces a bond of greater strength than the more recent formulation. The effect of this dramatic improvement indicates that epoxy bonding may be advantageously used in areas requiring relatively large panel bonding, such as the automotive industry. The increased efficiency of energy application permits the use of very modest power sources compared to those now required to cure many feet of bond at once on a given panel or panels. Further, the coil design for such large panels and work is much more readily fabricated with the low frequency and low currents.

The invention can, however, obviously be applied to various other materials and particularly to those which have heretofore presented great difficulty in the fusion bonding area. Thus, liquid-urethane formulations which have been used as a heat activatable adhesives can advantageously use the integrated multiple particles of this invention. Likewise, a combination of epoxy and urethane adhesive materials would appear to advantageously use the heating system of the present invention. The advantage of the present invention is particularly significant in connection with such adhesives in that the increased heating effect permits, where desirable, a decrease in the required loading of the adhesive and a corresponding decrease in the viscosity. The decreased viscosity permits practical and reliable application to the substrate as by pumping. The reduction in the loading, particularly with a significant portion of the particles 5 being the submicron particles 9, reduces the wear on the pumping system by the particle laden adhesive. The present invention can also be tailored to a particular adhesive to generate and create a proper viscosity in the material for a given application, while simultaneously providing a very significant improvement in the heat rate generated within the adhesive layer. Thus, the present invention will be advantageously applied to many plastics but will be particularly useful in connection with polypropylene, polyethylene, polycarbonates, and polyamide which are widely used and have often created some degree of difficulty in bonding.

A heat generating element can readily be fabricated, with the integrated particle mass blended with a compatible thermoplastic, thermoset or castable carrier resin, and the mixture formed into a selected shape. For example, the mixture may be readily incorporated into a bladder or other actuating device such as disclosed in U.S. Pat. No. 4,541,891 which issued to Alfred F. Leatherman on Sept. 17, 1985. When activated by the induction field, the heat level in the selected shape can be substantially constant and the device used to form a heat seal with a corresponding configuration. By forming different shapes of actuating devices, heat seals in a great variety of shapes can be achieved.

In addition, the combined particles have been found to provide a highly unusual and effective result in that the particles can be placed in a domestic microwave energy field to raise the temperature of a bonding agent. Generally, iron oxide particles of the submicron size have produced too little heat to be of significant practical value in the presence of microwave energy. The present invention has been found to increase the heat generating rate, for example, of a silicone resin including a mixture of 20% ferric oxide particles and 30% minus 200 mesh ferrous particles iron in a 50% RTV 700 silcone rubber carrier. The test element was approximately 0.038 inches thick. The resin in the element became an estimated 200° F. in response to heating in a microwave oven with a 650 watt power rating for 10 to 15 seconds. A conventional domestic microwave oven was used wherein the intensity of the microwave energy is of course significantly less than that which could be provided in a commercial or industrial microwave heating unit. Apparently the characteristic of non-conductive oxide and conductive ferrous particles is such that at least when embedded in a resin, the particles respond properly to microwave to produce an active heat source. Although the description has stressed the use of the submicron nonconductor particles, the preferred non-conductive particle can be significantly larger including micron particles.

The present invention in the broadest sense discloses the combination of conductive particles and the non-conductive particles which are intermixed to form a heat generating aggregate in the presence of an essentially single radio frequency magnetic field. The conductive particles have a high magnetic permeability while the non-conductive particles are poor conductors but have good magnetic properties and generate significant hysteresis. Although the preferred known non-conductive and the conductive particles are commercially available, other particles may be developed and particles may be formed by any suitable process, such as magnetic stainless steel particles in place of the more common carbon plain iron particles presently used in inductive eddy current heating.

Various modes of carrying out the invention are contemplated as being within the scope of the following claims particularly pointing out and distinctly claiming the subject matter which is regarded as the invention.

I claim:

1. The process of fusion bonding first and second plastic substrates by subjecting the substrates to a radio frequency magnetic field, comprising the steps of mixing a first plurality of particles having a submicron size and a second plurality of particles having a micron size, said first and second plurality of particles being thoroughly distributed with each other to define a single integrated particle aggregate, and mixing said mixed particles with an inductively inert resin carrier to form a bonding layer, said mixed particles forming a substantially greater percentage by weight than said carrier, said first particles being responsive to a magnetic field to generate heat because of hysteresis, said second particles being responsive to said same magnetic field to generate heat because of eddy current flow in said second particles, placing said bonding layer in intimate contact with said substrates, and subjecting said substrates and bonding layer to a single magnetic field established by a substantially single frequency to simultaneously activate each of said particles in said integrated particle aggregate to significantly create heat within each of said first and second particles and having said heat distributed throughout said carrier.

2. The process of claim 1 wherein said magnetic field includes a radio frequency selected from the range of about 500 KH$_z$ to 5 MH$_z$.

3. The heating process of claim 2 wherein said second particles constitute a significantly greater percentage by weight than said first particles of the total particle mass.

4. The process of claim 3 wherein second particles constitute about twice the weight of the first particles.

5. The process of claim 1 wherein said magnetic field includes a radio frequency selected from the range of about 3.5 to 4 MH$_z$.

6. The process of claim 1 wherein said magnetic field includes a radio frequency selected from the range of about 1.2 KH$_z$ to 7 HH$_z$.

7. The process of claim 1 wherein said second particles constitute a greater percentage by weight than said first particles of the integrated particle aggregate.

8. The process of claim 1 wherein the second particles constitute about twice the weight by the first particles.

9. The process of claim 8 wherein the second particles constitute substantially 40 percent by weight of the bonding layer and said first particles constitutes substantially 25 percent by weight of said bonding layer.

10. The process of claim 9 wherein said second particles are larger than 200 mesh and said first particles are less than one micron.

11. The process of claim 1 wherein the size of the first plurality of particles are greater than a minus 200 mesh, and the size of the second plurality of particles are less than one micron.

12. The process of claim 9 wherein said particle aggregate is distributed throughout said bonding plastic layer to define a selected heating pattern of a substantially constant heat level.

13. The process of claim 1 wherein the bonding layer resin is molten to establish a readily flowing bonding layer in response to the heat of said particles.

14. The process of claim 1 including providing a heating coil connected to an RF source with the coil sides spaced from each other by about one quarter inch and from the bonding element by slightly less than one-eighth inches.

15. The process of heating a substrate by subjecting such material to a radio frequency magnetic field of essentially one frequency, comprising the steps of mixing a first plurality of particles having a submicron size and a second plurality of particles having a micron size, said first and second plurality of particles being thoroughly distributed to define a single integrated particle aggregate, said first particles being responsive to a magnetic field to generate heat because of hysteresis, said second particles being responsive to said same magnetic field to generate heat because to eddy current flow in said second particles, placing said integrated particles in intimate contact with said material for heating response in the presence of said magnetic field, and subjecting said integrated particles to said magnetic field established by a substantially single frequency and of a frequency to create significant heat levels in each of said first and second particles.

16. The heating process of claim 15 wherein said second particles constitute a greater percentage by weight than said first particles of the integrated particle aggregate.

17. The heating process of claim 15 wherein the second particles constitute about twice the weight of the first particles.

18. The process of claim 15 including establishing said magnetic field with a radio frequency selected from the range of about 1.2 to 7 megahertz.

19. The process of claim 18 wherein said magnetic field includes a radio frequency selected from the range of 3.5 to 4 megahertz.

20. The process of claim 18 wherein the size of the second plurality of particles is greater than 200 mesh, and the size of the first plurality of particles is less than one micron.

21. The process of claim 18 wherein the second particles constitute substantially 60 percent by weight of said particle aggregate and said first particles constitutes substantially 40 percent by weight of said particle aggregate.

22. The process of claim 21 wherein said second particles are larger than 200 mesh and said first particles are less then one micron.

23. A process of heating a substrate using a radio frequency magnetic field, comprising mixing a first plurality of particles of a high magnetic loss and low electrical conductivity, a second plurality of particles of high magnetic permeability and high electrical conductivity, mixing said first and second plurality of particles to form an integrated particle aggregate, placing said aggregate in intimate contact with the substrate, and subjecting said aggregate and substrate to a radio frequency magnetic field established by a substantially single frequency.

24. The process of claim 23 wherein said magnetic field includes a radio frequency selected from the range of about 500 $KH_z$ to 5 $MH_z$.

* * * * *

UNITED STATES PATENT AND TRADEMARK OFFICE
CERTIFICATE OF CORRECTION

PATENT NO. : 4,969,968
DATED : November 13, 1990
INVENTOR(S) : ALFRED F. LEATHERMAN It is certified that error appears in the above-identified patent and that said Letters Patent is hereby corrected as shown below:

Claim 6, column 14, line 3, delete "$HH_r$" and substitute therefor -- $MH_r$ --; Claim 15, column 14, line 42, delete "to" and substitute therefor -- of --.

Signed and Sealed this

Twenty-ninth Day of May, 2001

*Attest:*

NICHOLAS P. GODICI

*Attesting Officer*     *Acting Director of the United States Patent and Trademark Office*